United States Patent
Chickmenahalli et al.

(10) Patent No.: US 6,783,156 B2
(45) Date of Patent: Aug. 31, 2004

(54) PASSENGER RESTRAINT

(75) Inventors: Arun A. Chickmenahalli, Ann Arbor, MI (US); Todd L. Depue, Brighton, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/269,006

(22) Filed: Oct. 10, 2002

(65) Prior Publication Data

US 2004/0070188 A1 Apr. 15, 2004

(51) Int. Cl.[7] .............................................. B60R 21/045
(52) U.S. Cl. ....................... 280/752; 180/90; 188/377; 296/187.05
(58) Field of Search ................................ 280/750–752, 280/779; 188/371, 377; 180/90; 296/70, 187.03, 187.05, 187.09

(56) References Cited

U.S. PATENT DOCUMENTS

| | | | |
|---|---|---|---|
| 3,834,482 A | 9/1974 | Wada et al. | |
| 3,930,665 A | 1/1976 | Ikawa | |
| 4,065,157 A | * 12/1977 | Abe et al. | 280/751 |
| 4,109,959 A | 8/1978 | Barecki et al. | |
| 4,227,593 A | 10/1980 | Bricmont et al. | |
| 4,721,329 A | 1/1988 | Brantman et al. | |
| 5,098,124 A | 3/1992 | Breed et al. | |
| 5,219,197 A | * 6/1993 | Rich et al. | 293/120 |
| 5,573,272 A | 11/1996 | Teshima | |
| 5,636,866 A | 6/1997 | Suzuki et al. | |
| 5,836,547 A | 11/1998 | Koch et al. | |
| 6,085,878 A | 7/2000 | Araki et al. | |
| 6,086,098 A | 7/2000 | Reiter et al. | |
| 6,158,771 A | 12/2000 | Nusser et al. | |
| 6,318,755 B1 | 11/2001 | Nusser et al. | |
| 2002/0017805 A1 | 2/2002 | Carroll, III et al. | |
| 2002/0046911 A1 | 4/2002 | Sacks et al. | |

FOREIGN PATENT DOCUMENTS

| | | |
|---|---|---|
| DE | 39 22 460 | 1/1991 |
| EP | 0 887 573 A1 | 12/1998 |
| GB | 2 324 508 | 10/1998 |
| JP | 64-9048 | * 1/1989 |
| JP | 3-109147 | 5/1991 |

* cited by examiner

*Primary Examiner*—Ruth Ilan
(74) *Attorney, Agent, or Firm*—Bill C. Panagos

(57) ABSTRACT

A passenger restraint includes a knee bolster having receptacles for receiving knee blockers. The knee blockers are multi-celled elements that absorb kinetic energy attributed to collisions of a motor vehicle.

21 Claims, 2 Drawing Sheets

PASSENGER RESTRAINT

BACKGROUND OF INVENTION

1. Field of the Invention

This invention pertains to a passenger restraint to be used in a motor vehicle, usually in conjunction with either an airbag or a shoulder belt, to protect a passenger from injury during a frontal-type collision. More particularly, the invention relates to a knee bolster assembly that absorbs impact forces or collision energy and thus minimizes injury to the passenger.

2. Description of the Prior Art Invention

Studies have shown that during a frontal-type collision, the passenger moves forward at substantially the original speed of the motor vehicle with respect to the motor vehicle's body. Thus, the passenger can suffer serious injuries from impact with the instrument panel of the motor vehicle. While passenger restraints, such as seat belts, alleviate some injuries, other measures are necessary to further alleviate passenger injuries.

Supplemental restraints, such as airbags, automatic shoulder belts, and knee bolsters have been proposed. In a motor vehicle so equipped, the knee bolster acts to absorb the kinetic energy of the occupant during the frontal-type collision so that, theoretically, the risk of injury to the passenger is reduced. However, it is well known that such restraints add to the weight and cost of the motor vehicle.

What is needed is a low-cost passenger restraint that does not significantly contribute to the weight of the motor vehicle.

SUMMARY OF INVENTION

The present invention relates to a low-cost passenger restraint that does not significantly contribute to the weight of the motor vehicle. The restraint includes a knee bolster having receptacles for receiving low cost, lightweight knee blockers. The knee blockers are multi-celled elements that absorb kinetic energy attributed to collisions of a motor vehicle.

Various objects and advantages of this invention will become apparent to those skilled in the art from the following detailed description of the preferred embodiment, when read in light of the accompanying drawings.

DETAILED DESCRIPTION

Figure 1:
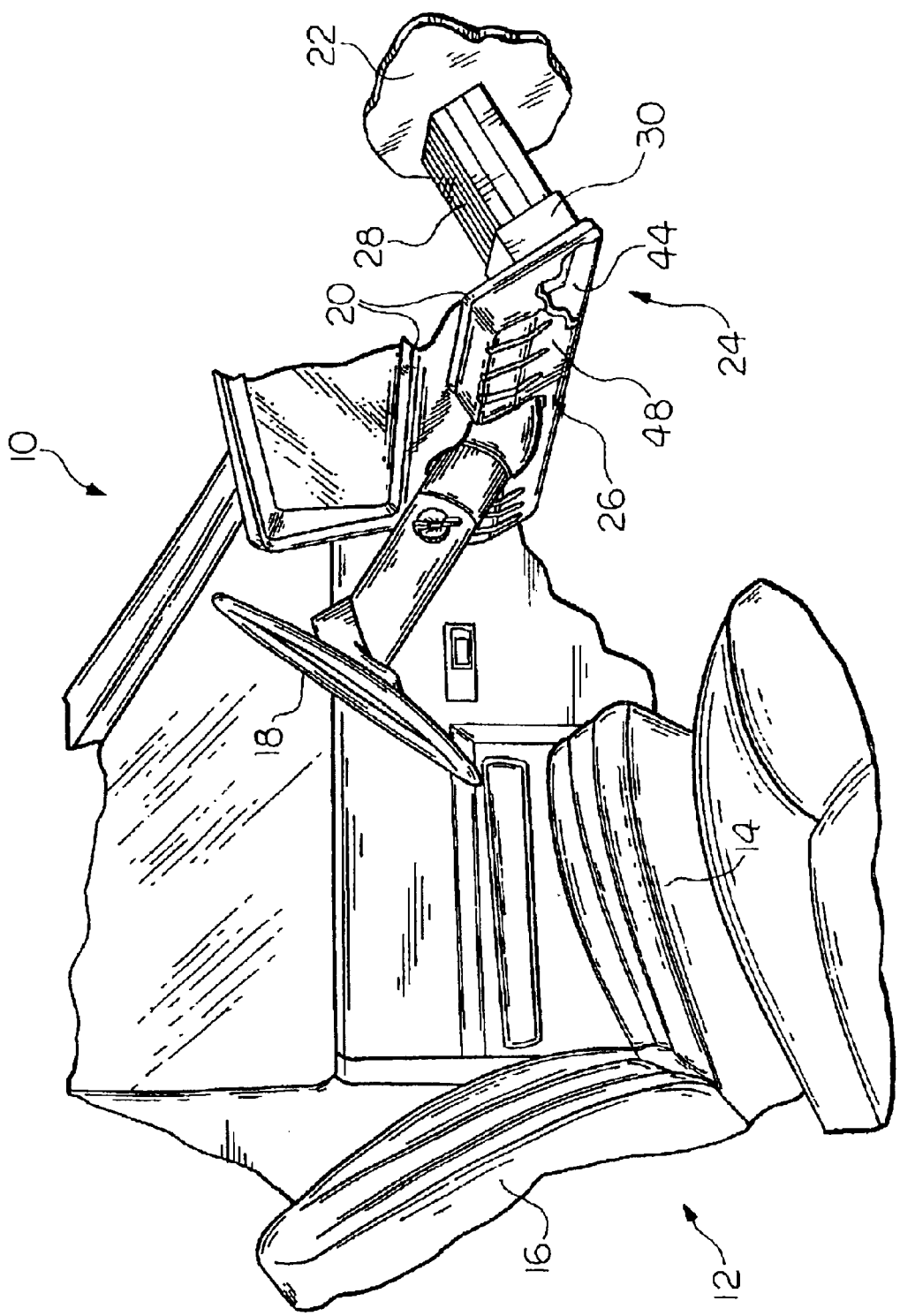
FIG. 1 shows a partial side-sectional view of an instrument panel of a motor vehicle with a restraint in accordance with the present invention.

Referring now to the drawings, there is illustrated in FIG. 1 an interior of a motor vehicle with a restraint according to the present invention. In this figure, the restraint shown includes a knee bolster located under the instrument panel of the motor vehicle. The knee bolster is provided for protecting a passenger of the motor vehicle in a frontal-type collision. The knee bolster could be placed at other locations within the motor vehicle for protecting other occupants.

The motor vehicle 10 illustrated in FIG. 1 includes a seat 12, having a seat base 14 and seatback 16, a steering wheel 18, which may include an airbag (not shown), a dashboard 20, a fire wall or cross-car beam 22, and a knee restraint system 24.

For the purposes herein, dashboard is defined to include the motor vehicle instrument panel, dashboard, and supporting structure. For the purposes herein, motor vehicle shall include automobiles, trucks, watercraft, and aircraft.

Figure 2:
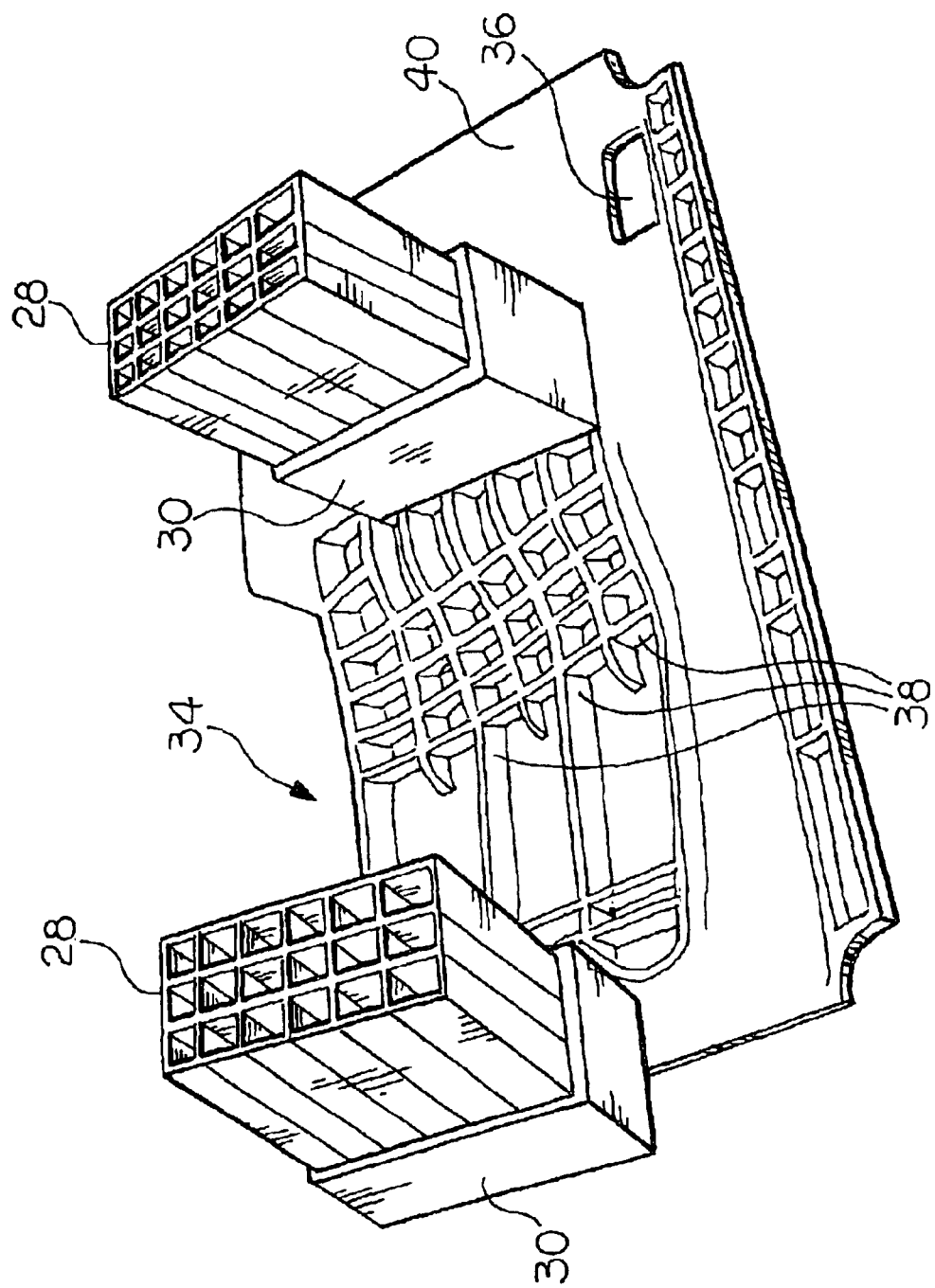
FIG. 2 shows a rear perspective view of the restraint.

As shown in FIG. 2, the knee restraint system 24 comprises a knee bolster 26, which is a panel-like structure that is to be secured relative to the dashboard 20. The knee bolster 26 has an inner surface with two receptacles 30 for receiving knee blockers 28. The knee blockers 28 are preferably press fit into the receptacles 30. The knee blockers 28 extend substantially perpendicularly back from the knee bolster 26 to the cross-car beam 22 so that impact is substantially parallel to the knee blockers 28. The knee bolster 26 is preferably set at an angle so as to distribute the impact loading uniformly over the passenger's knees.

The knee bolster 26 is also provided with a U-shaped opening 34 to accommodate a steering column and an opening 36 in the lower left hand corner to give access to a hood release latch, an emergency brake, or other similar devices located under the dashboard 20.

The knee bolster 26 includes reinforcement webbing 38, which provides rigidity to its panel-like structure, and may be made of plastic or other suitable material. The webbing 38 extends from a plate 40, which may be made of a sheet of plastic or other suitable material. The knee bolster 26 is structured to pass energy to the knee blockers 28 upon impact due to a frontal-type collision. An outer surface 44 of the knee bolster 26 can be provided with a layer of crushable polystyrene foam, about one and one-half inches thick. This layer can absorb energy on impact by deformation to protect the passenger's knees upon impact in the frontal-type collision.

The plate 40 and the outer surface 44 (shown in FIG. 1) can be wrapped in a skin or cover 48 (shown in FIG. 1). The lower front portion of the knee bolster 26 may be slanted to increase the normal leg spacing available for the passenger within the motor vehicle 10 and to minimize interference with the normal operation of the motor vehicle 10.

The knee blocker 28 is a protective element for absorbing impact loads. The knee blocker 28 is sandwiched between the inner surface of the knee bolster 26 and the cross-car beam 22. Consequently, the knee blocker 28 is concealed by the knee bolster 26.

The knee blocker 28 is preferably a multi-celled element. The term "multi-celled" should be construed broadly to include structures having any shape of open cells with adjacent cells separated by walls. Thus the cells can have almost any shape, for example circular, hexagonal, rectangular, elliptical, square, trapezium, trapezoid, or irregular. Preferably, the knee blocker 28 is formed from Wavecore (a product of ATS, Inc. in Natick, Mass.), which is a multi-celled element having square-shaped cells. Furthermore, the walls need not be of uniform thickness, either across a reaction surface (the surface that contacts the cross-car beam 22 during a frontal-type collision) of the knee blocker 28, nor in a direction perpendicular to the reaction surface of the knee blocker 28.

Preferably, the knee blocker 28 is a thermoplastic material, such as polypropylene, ABS tec, or polycarbonate. Alternatively, the knee blocker 28 may be a reinforced plastic material consisting of high tensile fibers, such as carbon, glass, Kevlar (a product of du Pont de Nemours and Company in Richmond, Va.), or Dyneema (a product of Toyobo in Japan), embedded in a thermosetting resin such as an epoxy or a thermoplastic resin, such as polyetherimide. A combination of thickness and materials used in the knee blocker 28 may be varied to tune the response of the knee blocker 28 to specific dynamic impact loads. Furthermore, the construction of the knee blocker 28 may be varied by using different materials, different densities, or cell sizes or cell shapes to vary the crush load.

The knee blocker 28 will become permanently deformed when subjected to an excessive impact loading. This permanent deformation results in the absorption of energy within the knee blocker 28, thereby protecting the passenger's knees. Furthermore, the knee blockers 28 can be conveniently removed from the receptacles 30 on the inner surface of the knee bolster 26, thereby enabling the knee blockers 28 to be replaced.

The knee blockers 28 according to the present invention realize up to about a 90% reduction in weight and about a 75–90% reduction in cost, as compared to conventional knee blockers.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A passenger restraint for a motor vehicle, the restraint comprising:
    a knee bolster having an inner surface with at least one receptacle extending outwardly from the inner surface; and
    a knee blocker for absorbing kinetic energy attributed to a collision of the motor vehicle, the knee blocker being received by the receptacle such that the knee blocker extends outwardly from an open end of the receptacle, the knee blocker being a multi-celled element.

2. The passenger restraint of claim 1, wherein the multi-celled element includes structures having any shape of open cells with adjacent cells separated by walls.

3. The passenger restraint of claim 2, wherein the walls vary in thickness.

4. The passenger restraint of claim 1, wherein the knee blocker is a thermo-plastic material.

5. The passenger restraint of claim 1, wherein the knee blocker is polypropylene.

6. The passenger restraint of claim 1, wherein the knee blocker is a reinforced plastic material consisting of high tensile fibers.

7. The passenger restraint of claim 1, wherein a combination of thicknesses and materials used in the knee blocker are varied to tune the response of the knee blocker to specific dynamic impact loads.

8. The passenger restraint of claim 1, wherein the knee blocker is structured using different materials forming the knee blocker, different densities, or cell sizes or cell shapes to vary the crush load of the knee blocker.

9. A motor vehicle comprising:
    a dashboard;
    a cross-car beam; and
    a passenger knee restraint system comprising:
        a knee bolster secured relative to the dashboard, the knee bolster having an inner surface with at least one receptacle extending outwardly from the inner surface; and
        a knee blocker received in at least one receptacle such that the knee blocker extends outwardly from an open end of the receptacle, the knee blocker being between the inner surface of the knee bolster and the cross-car beam, the knee blocker being a multi-celled element for absorbing kinetic energy attributed to a collision of the motor vehicle.

10. The passenger restraint of claim 9, wherein the multi-celled element includes structures having any shape of open cells with adjacent cells separated by walls.

11. The passenger restraint of claim 10, wherein the walls vary in thickness.

12. The passenger restraint of claim 9, wherein the knee blocker is a thermo-plastic material.

13. The passenger restraint of claim 9, wherein the knee blocker is polypropylene.

14. The passenger restraint of claim 9, wherein the knee blocker is a reinforced plastic material consisting of high tensile fibers.

15. The passenger restraint of claim 9, wherein a combination of thicknesses and materials used in the knee blocker are varied to tune the response of the knee blocker to specific dynamic impact loads.

16. The passenger restraint of claim 9, wherein the knee blocker is structured using different materials forming the knee blocker, different densities, or cell sizes or cell shapes to vary the crush load of the knee blocker.

17. The passenger restraint of claim 9, wherein the inner surface of the knee bolster further has a plurality of receptacles including the at least one receptacle, the restraint further comprising a plurality of knee blockers including the at least one knee blocker, each of the knee blockers being received in a corresponding one of the receptacles.

18. The passenger restraint of claim 1, wherein the knee blocker has a first end and a second end, the first end being disposed in the receptacle and the second end being exposed from the receptacle, and wherein the receptacle includes walls surrounding the first end of the knee blocker.

19. The passenger restraint of claim 1, wherein the knee blocker is press fit into the receptacle.

20. The passenger restraint of claim 9, wherein the knee blocker has a first end and a second end, the first end being disposed in the receptacle and the second end being exposed from the receptacle, and wherein the receptacle includes walls surrounding the first end of the knee blocker.

21. The passenger restraint of claim 9, wherein the knee blocker is press fit into the receptacle.

* * * * *